United States Patent
Chou et al.

(10) Patent No.: US 10,278,895 B2
(45) Date of Patent: May 7, 2019

(54) PORTABLE DEVICE FOR COLD CHAIN STORAGE

(71) Applicant: Tokitae LLC, Bellevue, WA (US)

(72) Inventors: Fong-Li Chou, Bellevue, WA (US); Lawrence Morgan Fowler, Kirkland, WA (US); Fridrik Larusson, Seattle, WA (US); Shieng Liu, Bellevue, WA (US); Nels R. Peterson, Bellevue, WA (US); David J. Yager, Carnation, WA (US)

(73) Assignee: Tokitae LLC, Bellevue, WA (US)

( * ) Notice: Subject to any disclaimer, the term of this patent is extended or adjusted under 35 U.S.C. 154(b) by 176 days.

(21) Appl. No.: 15/095,236

(22) Filed: Apr. 11, 2016

(65) Prior Publication Data

US 2017/0290741 A1    Oct. 12, 2017

(51) Int. Cl.
| | |
|---|---|
| *A61J 1/16* | (2006.01) |
| *B65D 81/38* | (2006.01) |
| *F25D 3/08* | (2006.01) |
| *F25D 16/00* | (2006.01) |
| *F25D 3/00* | (2006.01) |

(52) U.S. Cl.
CPC .............. *A61J 1/165* (2013.01); *B65D 81/38* (2013.01); *F25D 3/005* (2013.01); *F25D 3/08* (2013.01); *F25D 16/00* (2013.01); *A61J 2200/44* (2013.01); *F25D 2201/10* (2013.01); *F25D 2303/0831* (2013.01); *F25D 2303/0843* (2013.01); *F25D 2400/12* (2013.01); *F25D 2700/121* (2013.01)

(58) Field of Classification Search
CPC ......... A61J 1/165; A61J 2200/44; F25D 3/08; F25D 16/00; F25D 2201/10; F25D 2303/0831; F25D 2303/0843; F25D 2700/121
See application file for complete search history.

(56) References Cited

U.S. PATENT DOCUMENTS

| | | |
|---|---|---|
| 4,821,914 A | 4/1989 | Owen et al. |
| 5,934,099 A | 8/1999 | Cook et al. |

(Continued)

FOREIGN PATENT DOCUMENTS

| | | |
|---|---|---|
| CN | 104139924 A | 11/2014 |
| WO | WO 2012/062314 A1 | 5/2012 |
| WO | WO 2015/112573 A1 | 7/2015 |

OTHER PUBLICATIONS

PCT International Search Report; International App. No. PCT/US2017/026771; dated Jul. 17, 2017; pp. 1-3.

*Primary Examiner* — Marc E Norman

(57) ABSTRACT

Disclosed embodiments include portable devices for cold chain storage and methods of fabricating portable devices for cold chain storage. In an illustrative embodiment, a portable device for cold chain storage includes a container defining therein a storage region. The container includes an inner cylinder, and the storage region is defined coaxially inwardly of the inner cylinder. The inner cylinder includes phase change material disposed therein, and the phase change material is in thermal communication with the storage region. The inner cylinder also includes evaporative coils disposed therein. The evaporative coils are embedded in the phase change material. The container also includes a thermally insulated outer cylinder. An outer wall of the outer cylinder is disposed radially outwardly of an outer wall of the inner cylinder.

30 Claims, 28 Drawing Sheets

(56) References Cited

U.S. PATENT DOCUMENTS

| | | | |
|---|---|---|---|
| 5,950,450 | A | 9/1999 | Meyer et al. |
| 6,209,343 | B1 | 4/2001 | Owen |
| 7,121,334 | B2 * | 10/2006 | Cho .......................... A23B 7/10 165/288 |
| 8,875,521 | B2 | 11/2014 | Danner et al. |
| 8,955,320 | B2 | 2/2015 | Xiang et al. |
| 2004/0226309 | A1 | 11/2004 | Broussard |
| 2006/0196215 | A1 | 9/2006 | Crumlin et al. |
| 2011/0067852 | A1 | 3/2011 | Farrar |
| 2014/0124158 | A1 | 5/2014 | Yamashita et al. |
| 2015/0143818 | A1 | 5/2015 | Eckhoff et al. |

\* cited by examiner

PORTABLE DEVICE FOR COLD CHAIN STORAGE

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

None.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

BACKGROUND

The present disclosure relates to cold chain storage.

Many vaccines are proteins, the configuration of which can change if a vaccine is either too hot or too cold. In order for efficacy of vaccines to be maintained, it is desirable to keep temperature of vaccines within a narrow range (typically between 2-8° C.) from their point of manufacture to the place where they will be used. To that end, vaccines typically entail achievement of a "cold chain"—that is, a temperature-controlled supply chain. Achieving a cold chain typically involves refrigerating vaccines during travel and/or storage.

Vaccines may be taken to poor locations and/or remote locations, such as very rural areas, where electrical power may not be available. Achieving a cold chain may be difficult when vaccines are taken to such locations. The absence of a cold chain in such locations may contribute to a lack of vaccinations.

SUMMARY

Disclosed embodiments include portable devices for cold chain storage and methods of fabricating portable devices for cold chain storage.

In an illustrative embodiment, a portable device for cold chain storage includes a container defining therein a storage region. The container includes an inner cylinder, and the storage region is defined coaxially inwardly of the inner cylinder. The inner cylinder includes phase change material disposed therein, and the phase change material is in thermal communication with the storage region. The inner cylinder also includes evaporative coils disposed therein. The evaporative coils are embedded in the phase change material. The container also includes a thermally insulated outer cylinder. An outer wall of the outer cylinder is disposed radially outwardly of an outer wall of the inner cylinder.

In another illustrative embodiment, another portable device for cold chain storage includes a container defining therein a storage region. The container includes an inner cylinder, and the storage region is defined coaxially inwardly of the inner cylinder. The inner cylinder includes phase change material disposed therein, and the phase change material is in thermal communication with the storage region. The inner cylinder also includes evaporative coils disposed therein. The evaporative coils are embedded in the phase change material. The container also includes a thermally insulated outer cylinder. An outer wall of the outer cylinder is disposed radially outwardly of an outer wall of the inner cylinder. The inner cylinder is fixedly disposed within the outer cylinder, and the inner cylinder and the outer cylinder form an annulus.

In another illustrative embodiment, another portable device for cold chain storage includes a container defining therein a storage region. The container includes an inner cylinder, and the storage region is defined coaxially inwardly of the inner cylinder. The inner cylinder includes phase change material disposed therein, and the phase change material is in thermal communication with the storage region. The inner cylinder also includes evaporative coils disposed therein. The evaporative coils are embedded in the phase change material. The container also includes a thermally insulated outer cylinder. An outer wall of the outer cylinder is disposed radially outwardly of an outer wall of the inner cylinder. The outer cylinder is removably disposable over the inner cylinder, and the inner cylinder and the outer cylinder form an annulus.

In another illustrative embodiment, a method of fabricating a portable device for cold chain storage is provided. Evaporative coils are disposed in an inner cylinder of a container. The evaporative coils are embedded in phase change material. A storage region of a container is defined coaxially inwardly of the inner cylinder, and the phase change material is in thermal communication with the storage region. A thermally insulated outer cylinder of the container is disposed radially outwardly of the inner cylinder such that an outer wall of the outer cylinder is disposed radially outwardly of an outer wall of the inner cylinder.

In another illustrative embodiment, another method of fabricating a portable device for cold chain storage is provided. Evaporative coils are disposed in an inner cylinder of a container. The evaporative coils are embedded in phase change material. A storage region of a container is defined coaxially inwardly of the inner cylinder, and the phase change material is in thermal communication with the storage region. The inner cylinder is fixedly disposed within a thermally insulated outer cylinder of the container such that the outer cylinder is disposed radially outwardly of the inner cylinder and such that an outer wall of the outer cylinder is disposed radially outwardly of an outer wall of the inner cylinder. The inner cylinder and the outer cylinder form an annulus.

In another illustrative embodiment, another method of fabricating a portable device for cold chain storage is provided. Evaporative coils are disposed in an inner cylinder of a container. The evaporative coils are embedded in phase change material. A storage region of a container is defined coaxially inwardly of the inner cylinder, and the phase change material is in thermal communication with the storage region. A thermally insulated outer cylinder of the container is removably disposed over the inner cylinder such that an outer wall of the outer cylinder is disposed radially outwardly of an outer wall of the inner cylinder. The inner cylinder and the outer cylinder form an annulus.

In another illustrative embodiment, a portable device for cold chain storage includes a container defining therein a storage region. The container includes an inner cylinder, and the storage region is defined coaxially inwardly of the inner cylinder. The inner cylinder includes phase change material disposed therein, and the phase change material is in thermal communication with the storage region. The inner cylinder also includes evaporative coils disposed therein. The evaporative coils are embedded in the phase change material. The container also includes a thermally insulated outer cylinder. An outer wall of the outer cylinder is disposed radially outwardly of an outer wall of the inner cylinder. A compressor is fluidly couplable to the evaporative coils, and an electrical battery is electrically couplable to the compressor. A lid is configured to sealingly cover the container.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
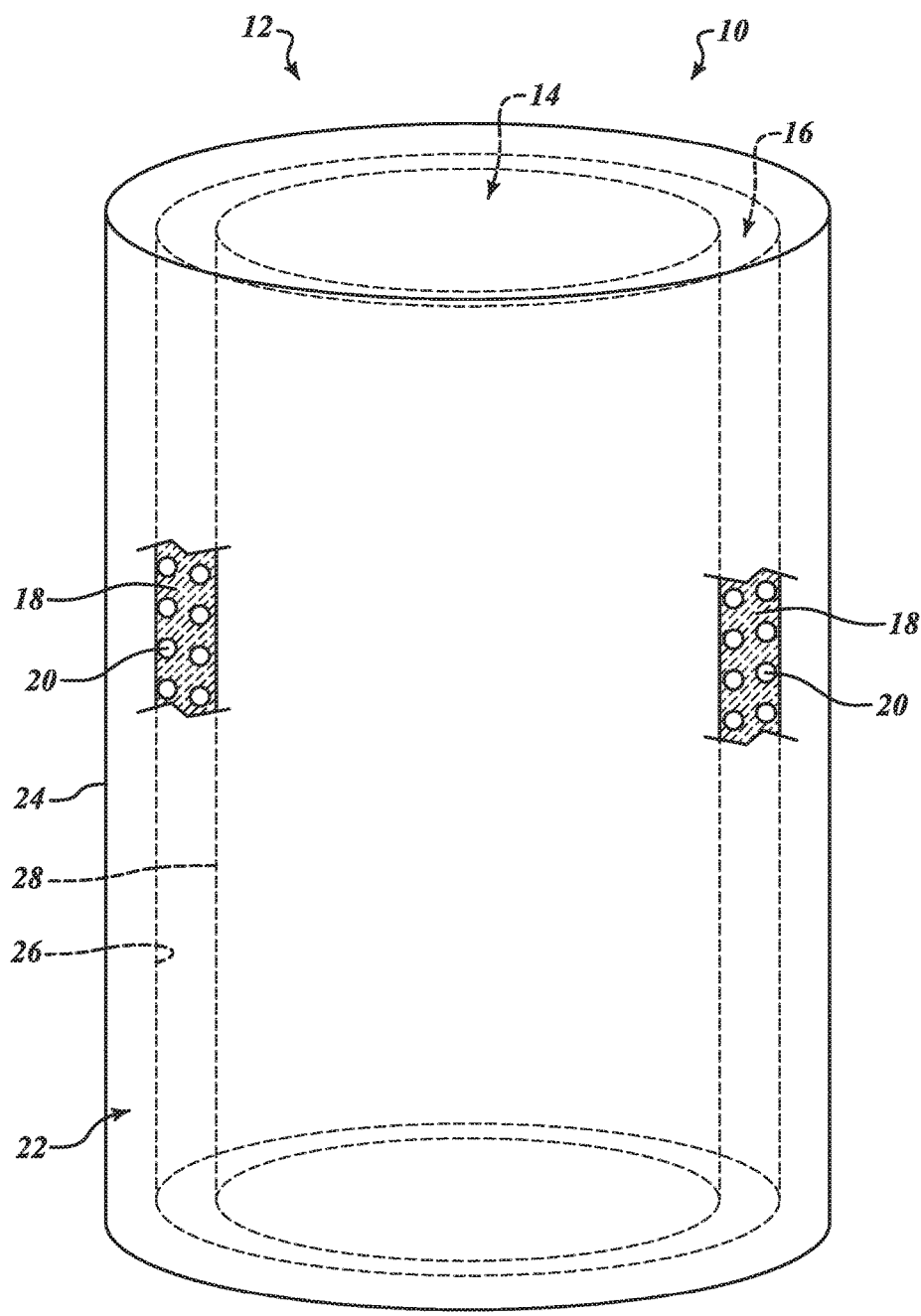
FIG. 1 is a perspective view in partial cutaway of an illustrative portable device for cold chain storage.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

In a general sense, those skilled in the art will recognize that the various embodiments described herein can be implemented, individually and/or collectively, by various types of electro-mechanical systems having a wide range of electrical components such as hardware, software (e.g., a high-level computer program serving as a hardware specification), firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software (e.g., a high-level computer program serving as a hardware specification), firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

By way of overview and referring to FIG. 1, an illustrative portable device 10 for cold chain storage includes a container 12 defining therein a storage region 14. The container 12 includes an inner cylinder 16, and the storage region 14 is defined coaxially inwardly of the inner cylinder 16. The inner cylinder 16 includes phase change material 18 disposed therein, and the phase change material 18 is in thermal communication with the storage region 14. The inner cylinder 16 also includes evaporative coils 20 disposed therein. The evaporative coils 20 are embedded in the phase change material 18. The container 12 also includes a thermally insulated outer cylinder 22. An outer wall 24 of the outer cylinder 22 is disposed radially outwardly of an outer wall 26 of the inner cylinder 16.

Figure 3:
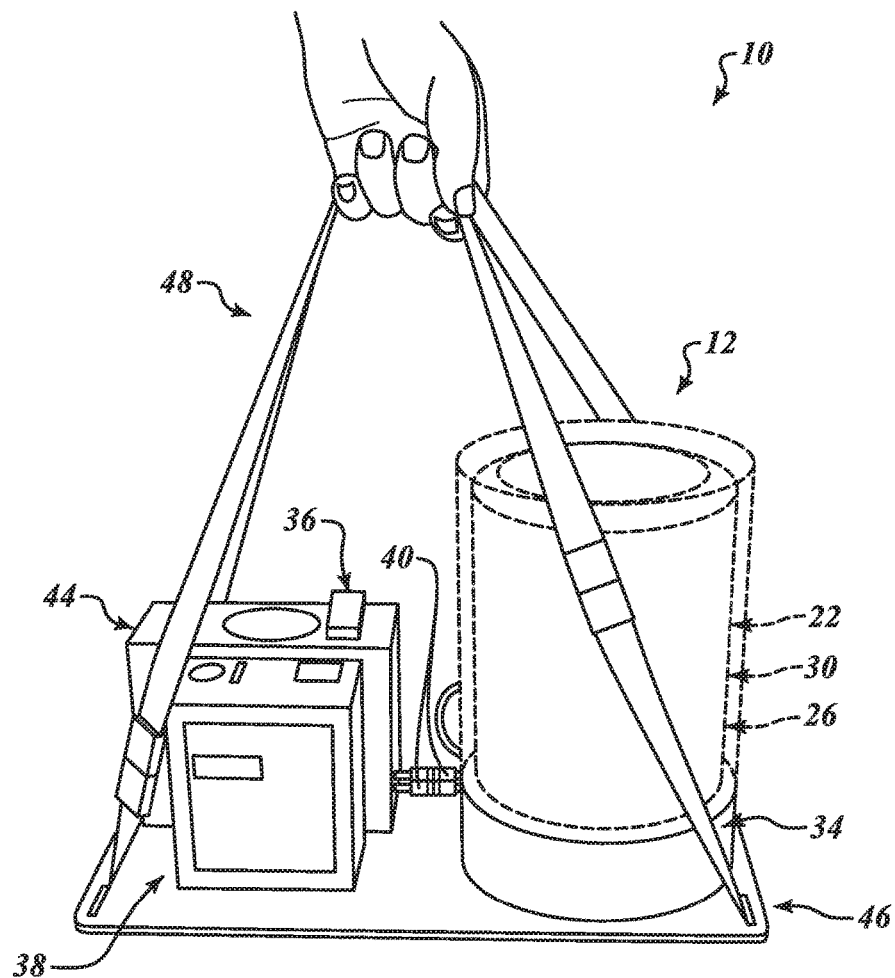
FIG. 3 is a perspective view of an illustrative portable device for cold chain storage.
Figure 4:
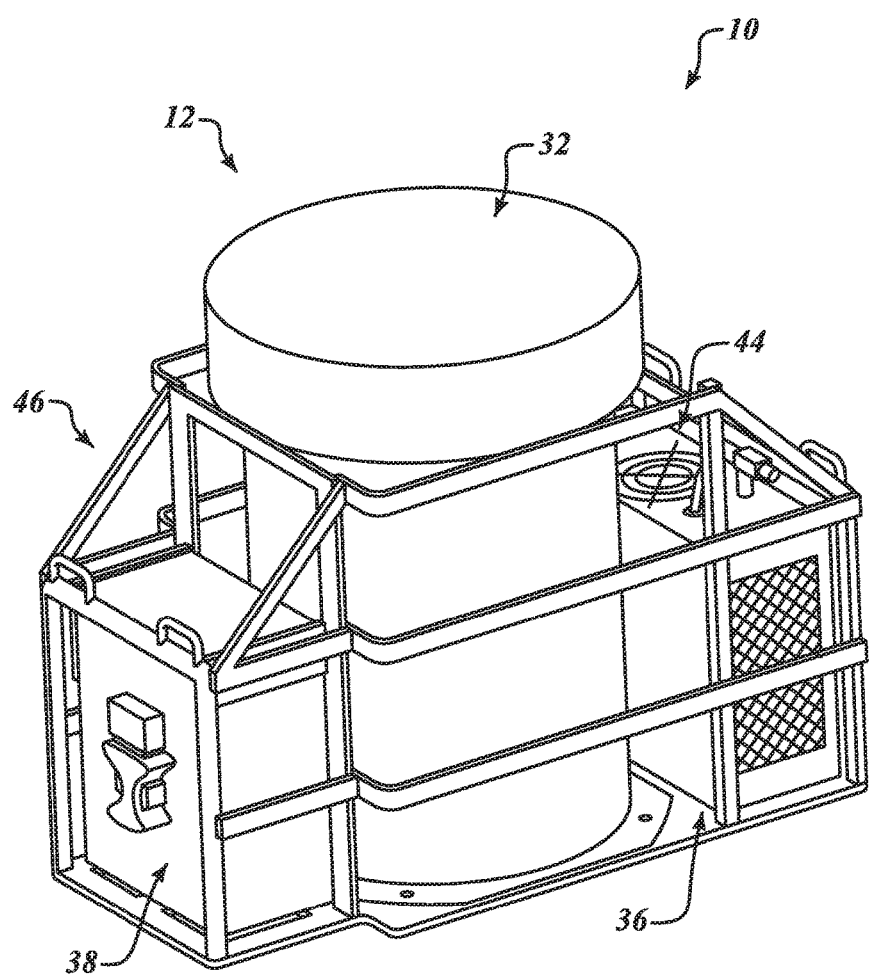
FIG. 4 is a perspective view of another illustrative portable device for cold chain storage.

Still by way of overview and referring additionally to FIGS. 3 and 4, given by way of non-limiting example in various embodiments a product, such as a vaccine, may be stored in the storage region 14. The insulated outer cylinder 22 can help reduce heat leakage, thereby helping to lengthen an amount of time that the product can be kept within a desired temperature range. In order to help maintain temperature of the product within the desired temperature range, under certain circumstances a compressor 36 that is electrically powered by an electrical battery 38 can subject refrigerant in the evaporative coils 20 to a refrigeration cycle, thereby lowering temperature of the refrigerant. Heat is, in turn, transferred from the phase change material 18 to the refrigerant, thereby lowering temperature of the phase change material such that the phase change material 18 changes phase. Heat is, in turn, transferred from the storage region 14 to the phase change material 18, thereby helping maintain temperature of the storage region (and the product, such as vaccines, stored therein) within a desired temperature range. The compressor 36 can be stopped upon attainment of a desired temperature.

Illustrative details will be set forth below by way of examples only and not of limitation.

Referring back to FIG. 1, the inner cylinder 16 and the outer cylinder 22 may be made of any material as desired. It is desirable for the inner cylinder 16 and the outer cylinder 22 to exhibit acceptable strength, heat transfer, and corrosion-resistance characteristics while remaining lightweight and low-cost. To that end, in some embodiments, the inner cylinder 16 and the outer cylinder 22 may be made of stainless steel, such as without limitation SAE 304 stainless steel or the like. It will be appreciated that no such limitation is intended and should not be inferred. To that end, the inner cylinder 16 and the outer cylinder 22 may be made of other stainless steels as desired or any other material as desired, such as without limitation copper, aluminum, and the like. However, in order to reduce the likelihood of dissimilar metal corrosion, it is desirable for the inner cylinder 16 and the outer cylinder 22 to be made of the same material. It will also be appreciated that the inner cylinder 16 and the outer cylinder 22 form an annulus. In various embodiments, the annulus formed by the inner cylinder 16 and the outer cylinder 22 includes the region bounded by the outer wall 24 of the outer cylinder 22 and an inner wall 28 of the inner cylinder 16. It will further be appreciated that the storage region 14 may be sized as desired for a particular application. For example, it may be desirable to maximize volume of the storage region 14 in order to maximize the amount of product, such as vaccines, that may be stored and transported. In sizing the storage region 14, in some embodiments and for a given amount of phase change material 18 the larger the volume of the storage region 14 the shorter the time between cycles of the compressor 36 entailed to re-freeze the phase change material 18. However, it will be appreciated that in some embodiments and with an increased amount of phase change material 18 the time between cycles of the compressor 36 entailed to re-freeze the phase change material 18 need not become shorter as the volume of the storage region 14 increases. Also, in general the larger the storage region 14 the larger the size of container 12, which may reduce portability characteristics of the device 10. Given by way of illustration only and not of limitation, in some embodiments the storage region may have a volume on the order of around 2 liters or so.

Figure 2:
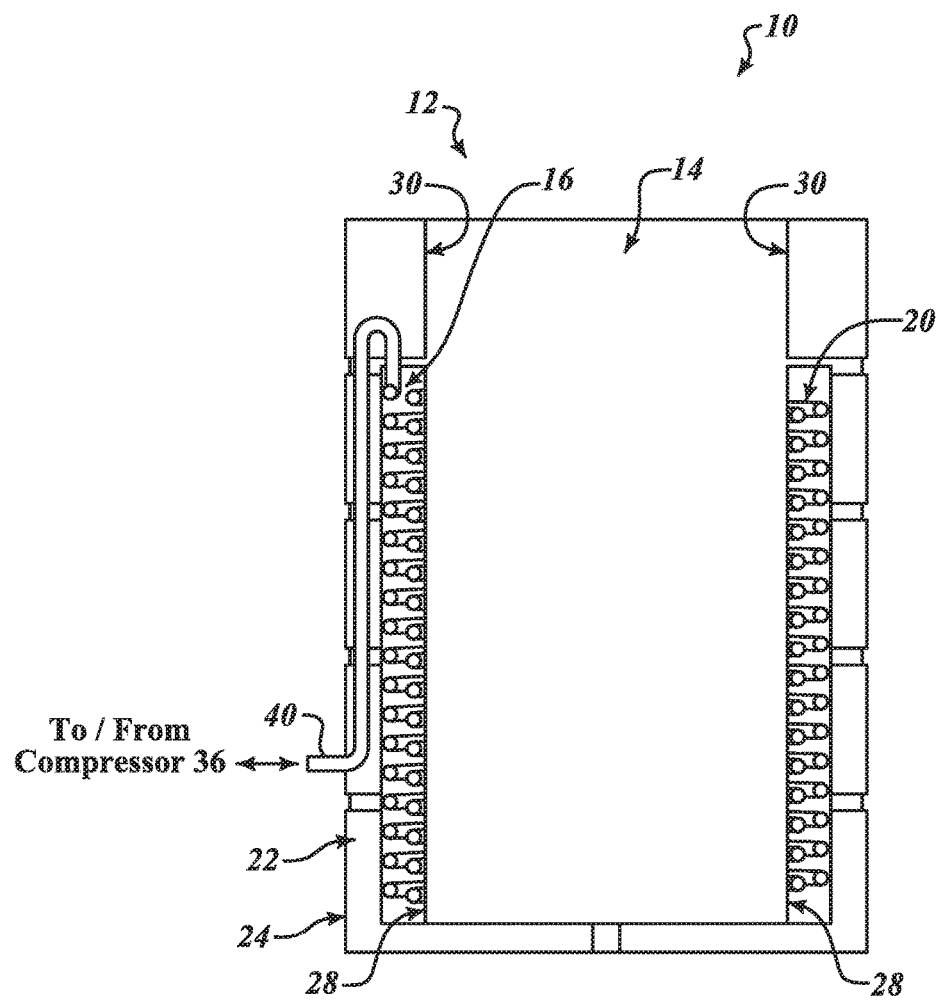
FIG. 2 is a side plan view in partial cutaway of details of components of an illustrative portable device for cold chain storage.

Referring now to FIGS. 1 and 2, in some embodiments the inner cylinder 16 may be fixedly disposed within the outer cylinder 22. In such embodiments, the inner cylinder 16 is defined between an inner wall 30 of the outer cylinder 22 and the outer wall 24 of the outer cylinder 22. In some embodiments, a portion of the inner wall 30 of the outer cylinder 22 is the inner wall 28 of the inner cylinder 16. In some other embodiments, the inner wall 28 of the inner cylinder 16 is fixedly attached to a portion of the inner wall 30 of the outer cylinder 22, such as by (without limitation) bonding, welding, soldering, adhesives, or fasteners such as rivets, bolts, screws, or the like.

Referring now to FIGS. 1 and 3, in some other embodiments the outer cylinder 22 (shown in phantom in FIG. 3 for clarity) may be removably disposable over the inner cylinder 16. In such embodiments, the inner wall 30 of the outer cylinder 22 is removably disposed radially outwardly of the outer wall 26 of the inner cylinder 16. Also, in such embodiments the inner cylinder 16 and the outer cylinder 22 are two separate, different cylinders that do not share portions of component walls. To that end, in such embodiments the inner wall 28 of the inner cylinder 16 and the outer wall 26 of the inner cylinder 16 are different from the inner wall 30 of the outer cylinder 22 and the outer wall 24 of the outer cylinder 22, respectively.

Referring now to FIGS. 1-4, in various embodiments the device 10 includes a lid configured to sealingly cover the container 12. As shown in FIG. 4, in some embodiments a lid 32 may be provided as a component that is separate from other components of the device 10. Such embodiments include those in which the inner cylinder 16 is fixedly disposed within the outer cylinder 22 (See FIGS. 1 and 2). The lid 32 may seal the container 12 in any acceptable manner. For example, the lid 32 may threadedly engage an exterior surface of the outer cylinder 22, or may latchedly engage an exterior surface of the outer cylinder 22, or the like. As shown in FIGS. 1 and 3, in embodiments in which the outer cylinder 22 is removably disposable over the inner cylinder 16, the outer cylinder 22 serves as the lid configured to sealingly cover the container 12. The outer cylinder 22 may seal the container 12 in any acceptable manner. For example, the outer cylinder 22 may threadedly engage an exterior surface of the inner cylinder 16, or may latchedly engage an exterior surface of a base 34 of the inner cylinder 16, or the like.

The evaporative coils 20 may be made of any material as desired for a particular application. It will be appreciated that it is desirable for the evaporative coils 20 to be made of material that exhibits desirable thermal conductivity while mitigating weight, thereby helping to contribute to portability. In various embodiments, the evaporative coils 20 may be made of copper. However, it is not intended that the evaporative coils 20 be limited to copper and no such inference should be made. In other embodiments, the evaporative coils may be made from stainless steel or any other material as desired.

As mentioned briefly above, in various embodiments the evaporative coils 20 include a refrigerant disposed therein. The refrigerant may include any acceptable refrigerant as desired for a particular application. Given by way of non-limiting examples, the refrigerant may include R134a, R-600a, R441a, and the like.

As mentioned above, the evaporative coils 20 are embedded in the phase change material 18. That is, the evaporative coils 20 and the phase change material 18 are in thermal communication with each other and, in various embodiments, may be in direct physical contact with each other. In various embodiments, the phase change material 18 may include any acceptable latent heat storage material as desired for a particular application. It will be appreciated that the phase change material 18 is selected to have a sufficiently high heat of fusion which, via melting and solidifying at a desired temperature, is capable of storing and releasing a desired amount of energy that (in concert with thermal insulation properties of the outer cylinder 22) is capable of helping maintain temperature of the storage region 14 (and any product stored therein) within a desired temperature range for a desired time period. Given by way of illustrative examples only and not of limitation, in some embodiments the phase change material 18 may be selected to maintain temperature of the storage region 14 in a range between 0° C. and 10° C. for a time period of about 24 hours. In some embodiments, the phase change material 18 may be selected to maintain temperature of the storage region 14 in a range between 2° C. and 8° C. for a time period of about 24 hours. In some embodiments, the phase change material 18 may be selected to maintain temperature of the storage region 14 in a range between 4° C. and 6° C. for a time period of about 24 hours.

Also given by way of non-limiting example, in various embodiments an illustrative phase change material 18 may freeze in a temperature range between around 2-3° C. In addition to the thermal characteristics discussed above, it is also desirable for the phase change material 18 to expand and contract within desirable limits. In view of the desirable characteristics discussed above and given by way of non-limiting examples, the phase change material may include without limitation tetradecane, which melts at about 4° C. and is available commercially as the product PureTemp 4, available from Entropy Solutions, Plymouth, Minn., USA. PureTemp 4 has a melting point of about 4° C., a freezing point of about 2-3° C., a latent heat of fusion of about 195 kJ/kg, a density of about 880 kg/m$^3$, and a specific heat of about 2.44 kJ/kg·K. However, no such limitation is intended and should not be inferred. To that end, any acceptable latent heat storage material with desired thermal and expansion/contraction properties may be used for the phase change material as desired for a particular application. By way of non-limiting examples, other phase change materials that could be used include PureTemp 6, Phase 5, and water. It will also be appreciated that any amount of the phase change material 18 may be used as desired for a particular application. For example, the amount (and type) of phase change material 18 used may depend in part on: the available volume of the inner cylinder 16 that is not occupied by the evaporative coils 20; the expansion and contraction performance of the phase change material 18; the desired temperature range to be maintained; and the heat leak rate from the container 12. For example and given only by way of non-limiting, illustrative example, in one illustrative embodiment the phase change material may include about one liter of Puretemp 4. In such an example, about 24 hours is entailed for about one liter of Puretemp 4 that has been frozen at about 2-3° C. to melt at its melting point of about 4° C. while being subject to a heat leak of about 2 W. In such a case, this configuration means that about 24 hours can elapse between the compressor 36 needing to run to maintain the temperature of the storage region 14.

As mentioned above, in various embodiments the outer cylinder 22 is thermally insulated. It will be appreciated that in some embodiments it is desirable to minimize weight of the device 10 and/or reduce heat leakage from the container 12. Given by way of illustration only and not of limitation, in some embodiments heat leakage from the container 12 may be on the order of around 2 W or so. To that end, in some embodiments the outer cylinder 22 may be thermally insulated with vacuum insulation. However, no such limitation is intended and should not be inferred. To that end, any acceptable thermal insulation material with desired thermal insulation and weight properties may be used for thermally insulating the outer cylinder 22 as desired for a particular application. By way of non-limiting examples, some embodiments may include thermal insulation material such as any one or more of vacuum insulated panels, polyurethane foam panels, and/or vacuum-surrounding glass beads.

As mentioned above by way of overview, in various embodiments the device 10 may include the compressor 36 (also known as a condensing unit) that is fluidly couplable to the evaporative coils 20 and the electrical battery 38 that is electrically couplable to the compressor 36. The compressor 36 is fluidly couplable to the evaporative coils via tubing 40. As shown in FIG. 2, the tubing 40 extends through the outer cylinder 22. As shown in FIG. 3, the tubing 40 extends through the base 34 of the inner cylinder 16. Any type of fitting or coupling, such as quick-disconnect fittings, compression fittings, or the like, may be used as desired to couple the compressor 36 to the tubing 40. As briefly mentioned above, under certain circumstances the compressor 36 can subject refrigerant in the evaporative coils 20 to a refrigeration cycle, thereby lowering temperature of the refrigerant. It will be appreciated that it would be desirable to select a compressor that is portable, lightweight, and has low consumption of electrical power. Given by way of illustration only and not of limitation, in some embodiments the compressor 36 may include a miniaturized compressor, such as an Aspen Miniature Rotary portable compressor or the like. In some embodiments, about 15 minutes or so of compressor run time may be entailed for the compressor 36 to cool refrigerant in the evaporative coils 20 sufficiently to freeze the phase change material 18. Depending on electrical power consumption of the compressor 36, in some embodiments on the order of around 100 W of electrical power may be consumed by the compressor 36 during 15 minutes of run time.

The electrical battery 38 may include any suitable electrical battery as desired for a particular application. In some embodiments, the battery 38 may include a Li battery, such as for example and without limitation a lithium-ion polymer ("LiPo" or "Li-poly") battery, a lithium polymer ("LiP") battery, a lithium ion ("Li-ion") battery, a lithium iron ("LiFe") battery, a lithium iron phosphate ("LiFePO$_4$" or "LFP") battery, or the like. However, the battery 38 need not be limited to a Li battery and no such limitation should be inferred. Batteries are extremely well known in the art and any acceptable battery using any battery technology may be used as desired for a particular application. Regardless of battery technology, in various embodiments the battery 38 may be selected based in part upon factors such as size, weight, and electrical capacity. Given by way of illustration only and not of limitation, in some embodiments electrical capacity of the battery 38 may be selected at around 280 W-hr. In such embodiments and in configurations in which the compressor 36 draws around 80 W during a run time event of about 15 minutes or so, it will be appreciated that the compressor 36 may run five times before the battery 38 is drained. In embodiments in which the device 10 is configured such that about 24 hours may elapse between compressor run time events, the device 10 may operate for about five days on a single battery 38.

Figure 5A:
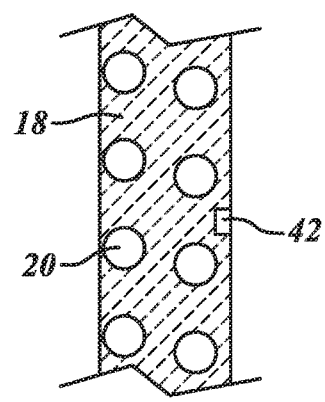
FIG. 5A is a side plan view in partial cutaway and in partial schematic view of a detail of an illustrative portable device for cold chain storage.
Figure 5B:
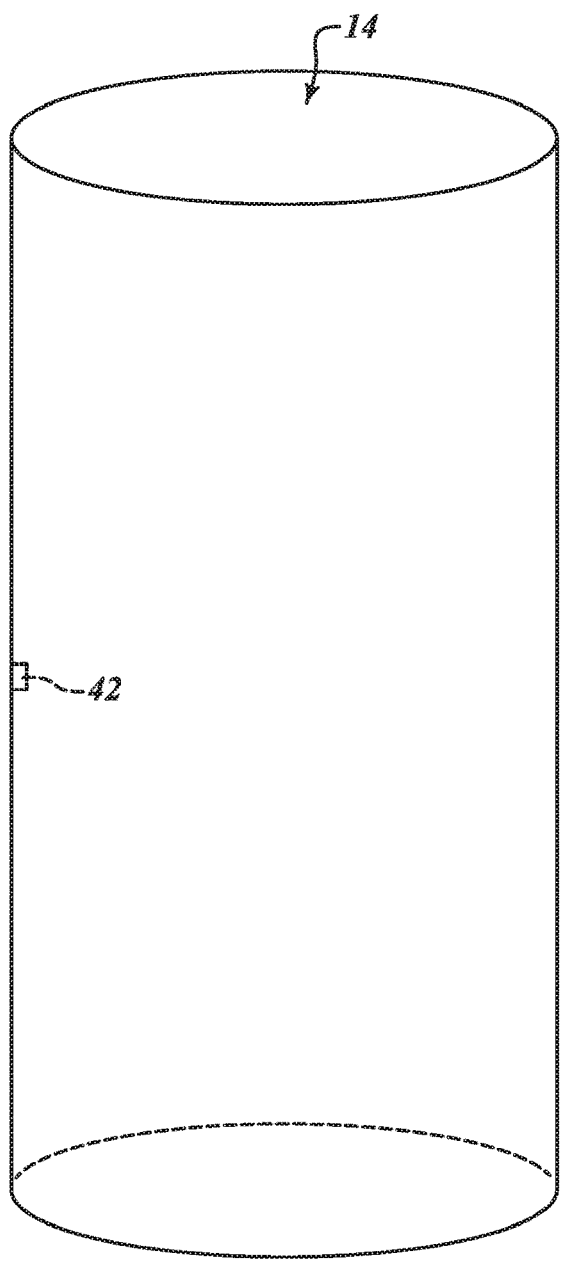
FIG. 5B is a side plan view in partial schematic view of another detail of an illustrative portable device for cold chain storage.

Referring additionally to FIGS. 5A and 5B, in various embodiments the device 10 may include a temperature sensor 42 and a controller 44 operatively couplable to the temperature sensor 42 and operatively coupled to the compressor 36. In such embodiments, the controller 44 is configured to control the compressor 36 responsive to the temperature sensor 42.

In various embodiments, the temperature sensor 42 may include any acceptable temperature sensor as desired, such as a thermocouple, a thermistor, a resistive temperature device, a digital temperature sensor, or the like. Also, in some embodiments the temperature sensor 42 may include a unique identification code, if desired. Referring now to FIG. 5A, in some embodiments the temperature sensor 42 may be disposed in thermal communication with the phase change material 18. In such cases, the temperature sensor 42 is disposed within the inner cylinder 16. Referring now to FIG. 5B, in some other embodiments, the temperature sensor 42 may be disposed in thermal communication with the storage region 14. In such cases, the temperature sensor 42 is disposed within the storage region 14.

In various embodiments, the controller 44 may be any controller, such as a computer controller or an "on-off" controller or the like, that is configured to turn on the compressor 36 when the temperature sensor 42 senses a predetermined high-threshold temperature and that is further configured to turn off the compressor 36 when the temperature sensor 42 senses a predetermined low-threshold temperature. In various embodiments, the controller 44 may include a microprocessor, such as without limitation an ARM, Intel, or Freescale platform or the like.

For example and given by way of illustration and not of limitation, in various embodiments that implement an operating range of 2-8° C. a control algorithm within the controller 44 causes the controller 44 to turn off the compressor 36 when the temperature sensor 42 measures a temperature of 2° C. within the storage region 14. In such an embodiment, the temperature sensor 42 is positioned to measure surface temperature of the storage region 14 (which should be substantially isothermal). The control algorithm within the controller 44 causes the controller 44 to turn on the compressor 36 when the temperature sensor 42 measures a temperature of 7.5° C. It will be appreciated that these setpoints can have other values as desired to support other operating ranges. In various embodiments the set points are directly related to the melting point of the phase change material 18. In that regards, it will be appreciated that it is desirable for the melting point of the phase change material 18 to be around the middle of the operating range. However, in some other embodiments a control algorithm other than an "on-off" control algorithm may be used to control the controller 44 as desired for a particular application.

As discussed above, it is desirable for the device 10 to be portable so the device 10 may be used to transport product, such as vaccines, to remote areas. To that end, in various embodiments the device 10 may include a frame 46 (FIG. 4) that is configured to receive therein the container 12, the compressor 36, and the electrical battery 38. In some of these embodiments, the device 10 may include a carrying member 48 (FIG. 3) that is attachable to the frame 46 and is configured to permit a user to carry the frame 46. It will be appreciated that any acceptable carrying member may be used as desired for a particular application, such as without limitation a strap, a handle, or the like.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 6A:
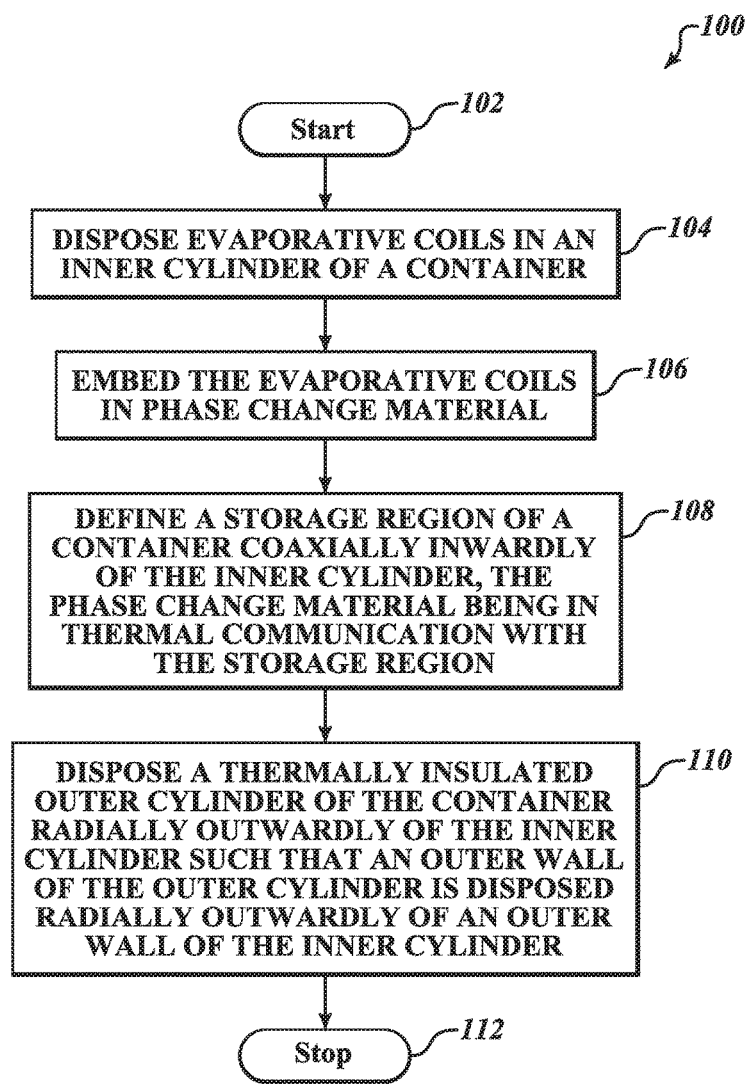
FIG. 6A is a block diagram of an illustrative method of fabricating a portable device for cold chain storage.

Referring now to FIG. 6A, an illustrative method 100 of fabricating a portable device for cold chain storage is provided. The method 100 starts at a block 102. At a block 104 evaporative coils are disposed in an inner cylinder of a container. At a block 106 the evaporative coils are embedded in phase change material. At a block 108 a storage region of a container is defined coaxially inwardly of the inner cylinder, and the phase change material is in thermal communication with the storage region. At a block 110 a thermally insulated outer cylinder of the container is disposed radially outwardly of the inner cylinder such that an outer wall of the outer cylinder is disposed radially outwardly of an outer wall of the inner cylinder. The method 100 stops at a block 112.

Figure 6B:
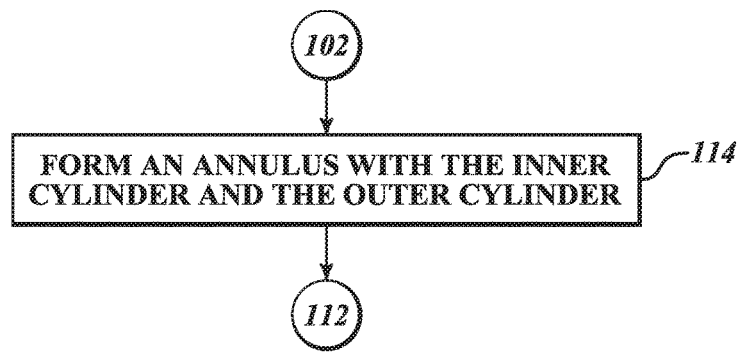
FIGS. 6B-6O are block diagrams of details of the method of FIG. 6A.

Referring to FIG. 6B, in some embodiments the method 100 may further include forming an annulus with the inner cylinder and the outer cylinder at a block 114.

Figure 6C:
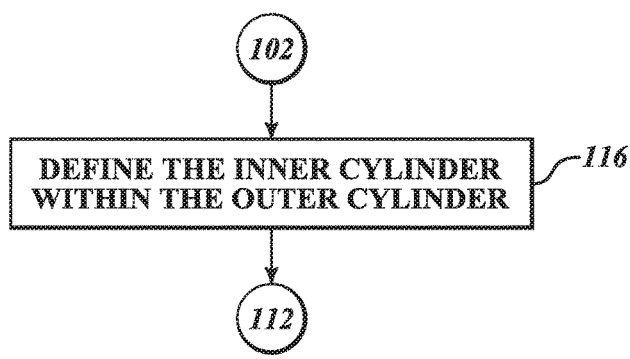

Referring to FIG. 6C, in some embodiments the method 100 may further include defining the inner cylinder within the outer cylinder at a block 116.

Figure 6D:
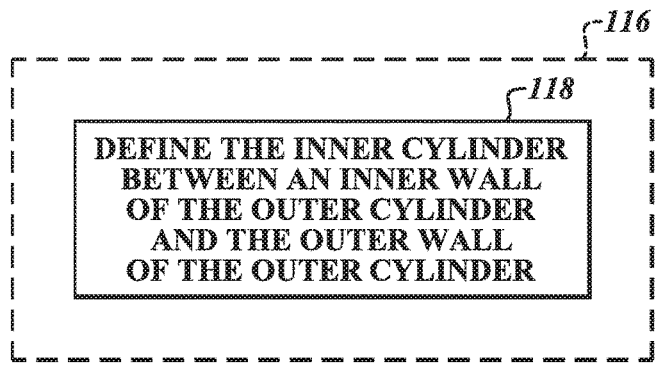

Referring to FIG. 6D, in some embodiments defining the inner cylinder within the outer cylinder at the block 116 may include defining the inner cylinder between an inner wall of the outer cylinder and the outer wall of the outer cylinder at a block 118.

Figure 6E:
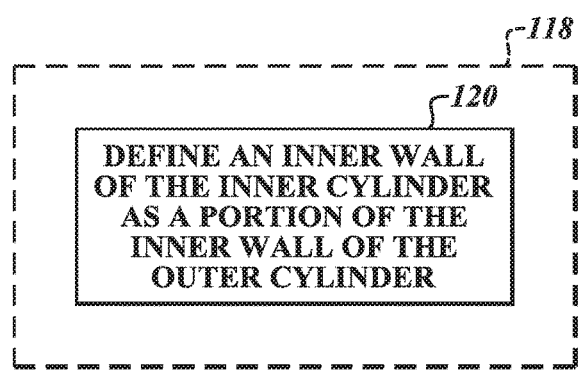

Referring to FIG. 6E, in some embodiments defining the inner cylinder between an inner wall of the outer cylinder and the outer wall of the outer cylinder at the block 118 may include defining an inner wall of the inner cylinder as a portion of the inner wall of the outer cylinder at a block 120.

Figure 6F:
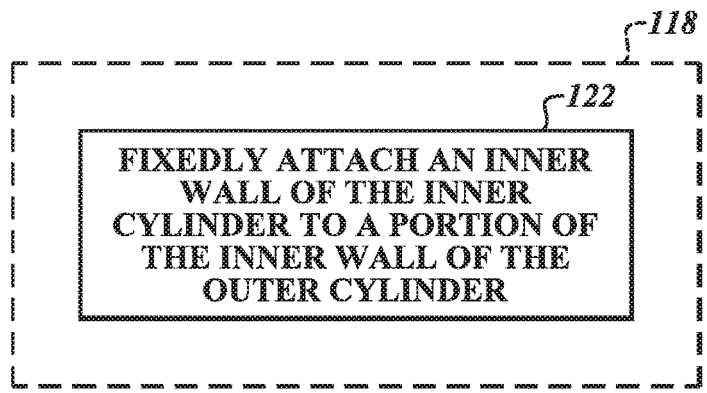

Referring to FIG. 6F, in some embodiments defining the inner cylinder between an inner wall of the outer cylinder and the outer wall of the outer cylinder at the block 118 may include fixedly attaching an inner wall of the inner cylinder to a portion of the inner wall of the outer cylinder at a block 122.

Figure 6G:
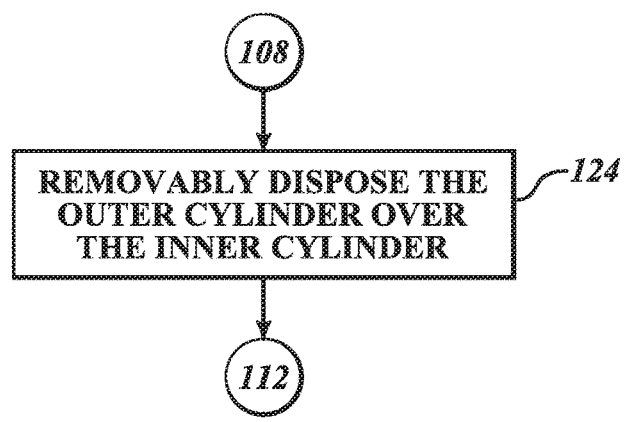

Referring to FIG. 6G, in some embodiments the method 100 may further include removably disposing the outer cylinder over the inner cylinder at a block 124.

Figure 6H:
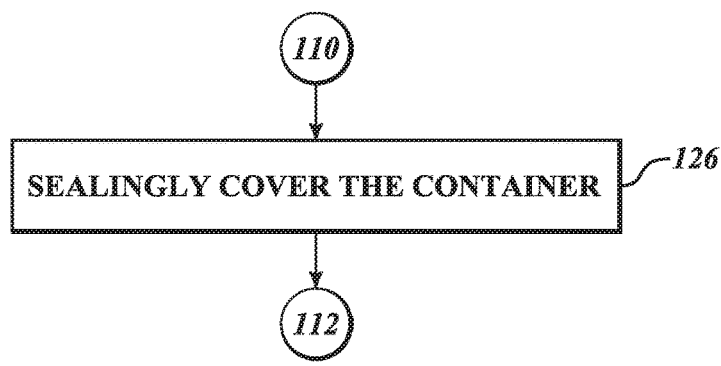

Referring to FIG. 6H, in some embodiments the method 100 may further include sealingly covering the container at a block 126.

Figure 6I:
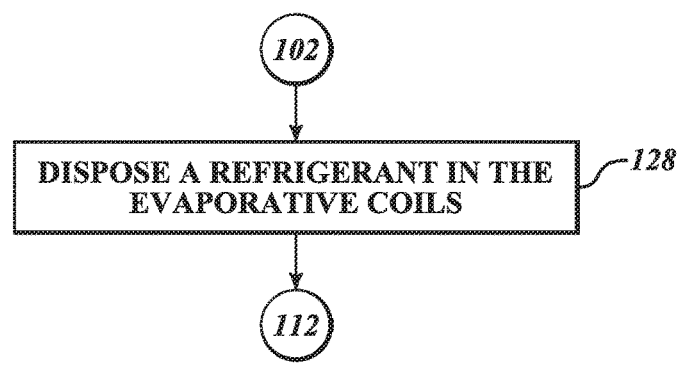

Referring to FIG. 6I, in some embodiments the method 100 may further include disposing a refrigerant in the evaporative coils at a block 128.

Figure 6J:
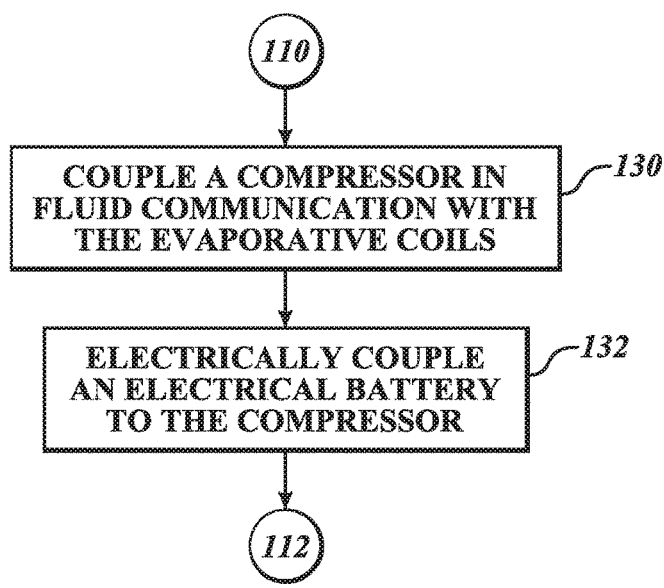

Referring to FIG. 6J, in some embodiments the method 100 may further include coupling a compressor in fluid communication with the evaporative coils at a block 130 and electrically coupling an electrical battery to the compressor at a block 132.

Figure 6K:
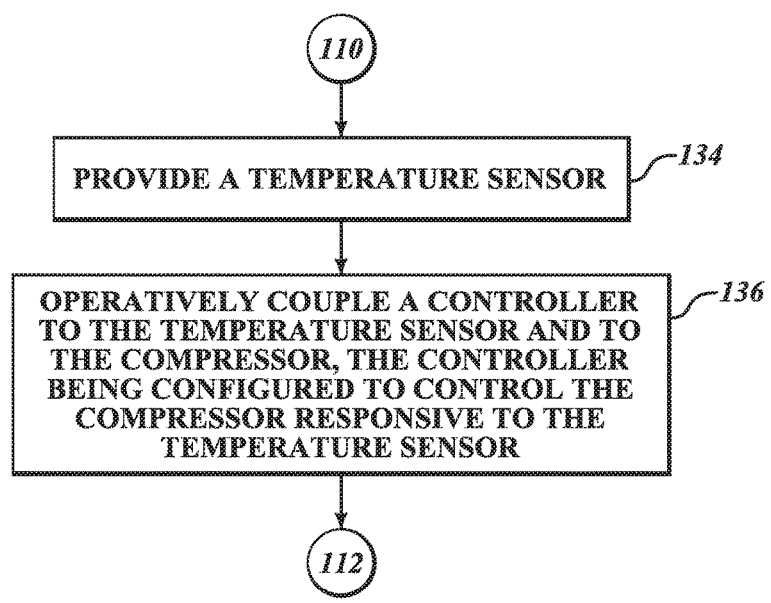

Referring to FIG. 6K, in some embodiments the method 100 may further include providing a temperature sensor at a block 134 and operatively coupling a controller to the temperature sensor and to the compressor, the controller being configured to control the compressor responsive to the temperature sensor, at a block 136.

Figure 6L:
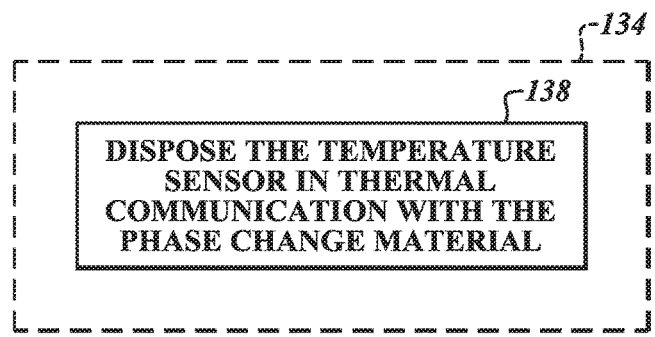

Referring to FIG. 6L, in some embodiments providing a temperature sensor at the block 134 may include disposing the temperature sensor in thermal communication with the phase change material at a block 138.

Figure 6M:
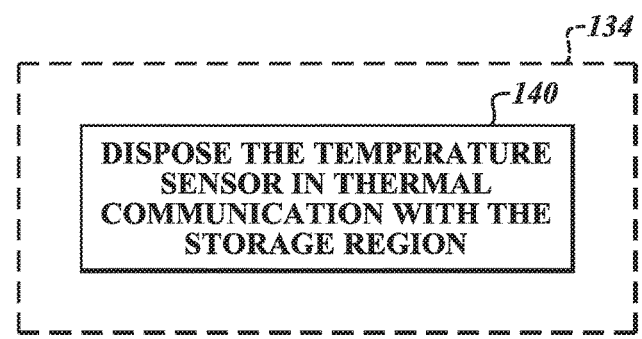

Referring to FIG. 6M, in some embodiments providing a temperature sensor at the block 134 may include disposing the temperature sensor in thermal communication with the storage region at a block 140.

Figure 6N:
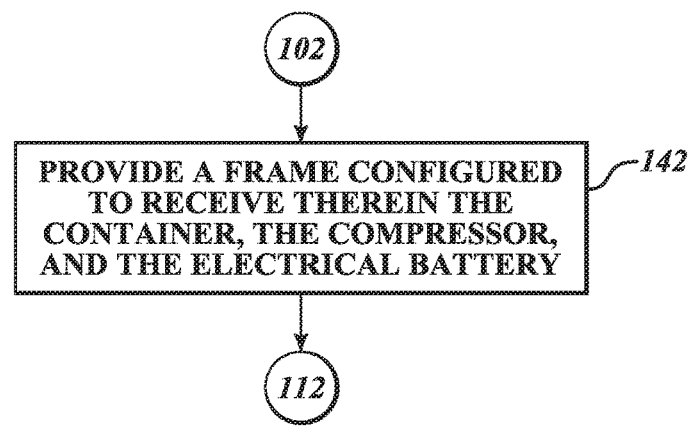

Referring to FIG. 6N, in some embodiments the method 100 may further include providing a frame configured to receive therein the container, the compressor, and the electrical battery at a block 142.

Figure 6O:
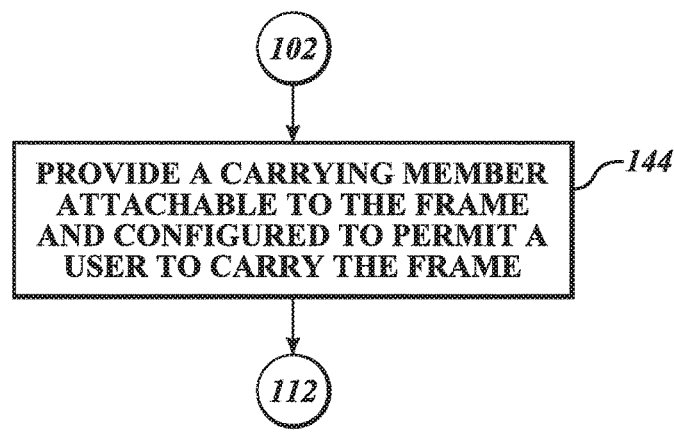

Referring to FIG. 6O, in some embodiments the method 100 may further include providing a carrying member attachable to the frame and configured to permit a user to carry the frame at a block 144.

Figure 7A:
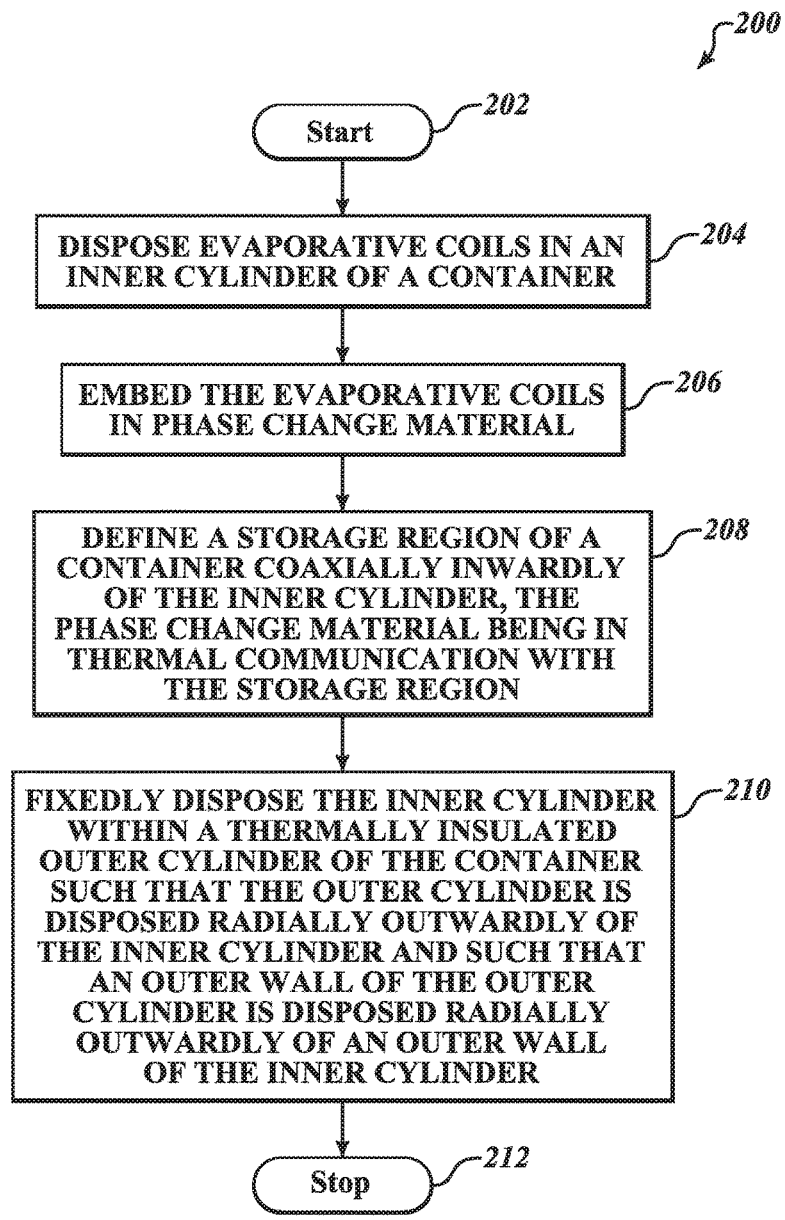
FIG. 7A is a block diagram of another illustrative method of fabricating a portable device for cold chain storage.

Referring now to FIG. 7A, another illustrative method 200 of fabricating a portable device for cold chain storage is provided. The method 200 starts at a block 202. At a block 204 evaporative coils are disposed in an inner cylinder of a container. At a block 206 the evaporative coils are embedded in phase change material. At a block 208 a storage region of a container is defined coaxially inwardly of the inner cylinder, and the phase change material is in thermal communication with the storage region. At a block 210 the inner cylinder is fixedly disposed within a thermally insulated outer cylinder of the container such that the outer cylinder is disposed radially outwardly of the inner cylinder and such that an outer wall of the outer cylinder is disposed radially outwardly of an outer wall of the inner cylinder. The inner cylinder and the outer cylinder form an annulus. The method 200 stops at a block 212.

Figure 7B:
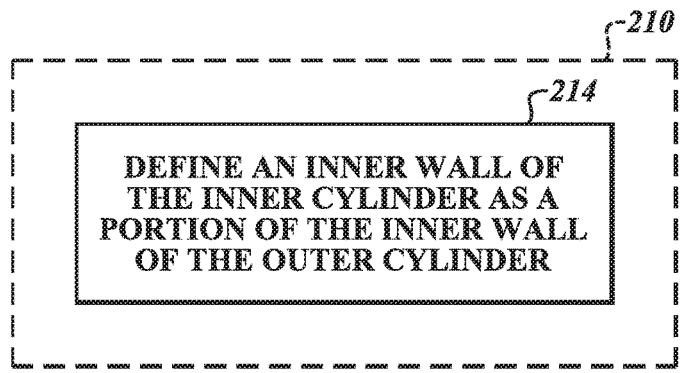
FIGS. 7B-7K are block diagrams of details of the method of FIG. 7A.

Referring to FIG. 7B, in some embodiments fixedly disposing the inner cylinder within the outer cylinder at the block 210 may include defining an inner wall of the inner cylinder as a portion of the inner wall of the outer cylinder at a block 214.

Figure 7C:
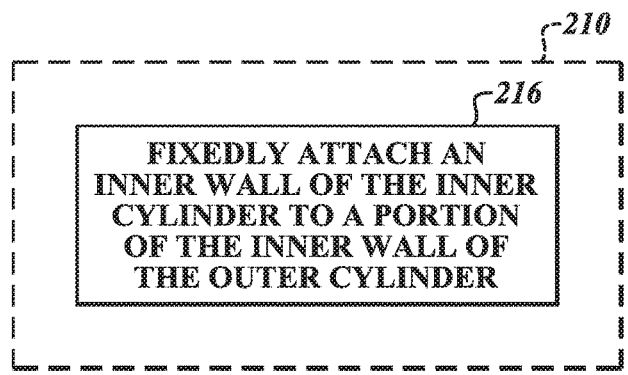

Referring to FIG. 7C, in some embodiments fixedly disposing the inner cylinder within the outer cylinder at the block 210 may include fixedly attaching an inner wall of the inner cylinder to a portion of the inner wall of the outer cylinder at a block 216.

Figure 7D:
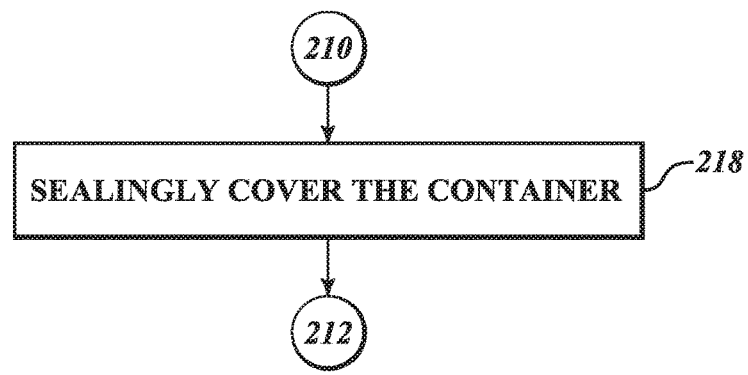

Referring to FIG. 7D, in some embodiments the method 200 may further include sealingly covering the container at a block 218.

Figure 7E:
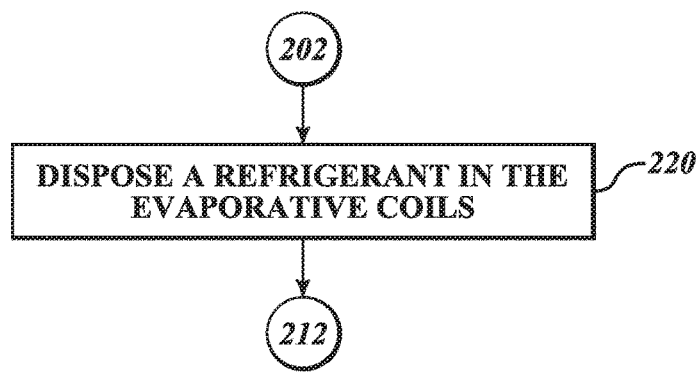

Referring to FIG. 7E, in some embodiments the method 200 may further include disposing a refrigerant in the evaporative coils at a block 220.

Figure 7F:
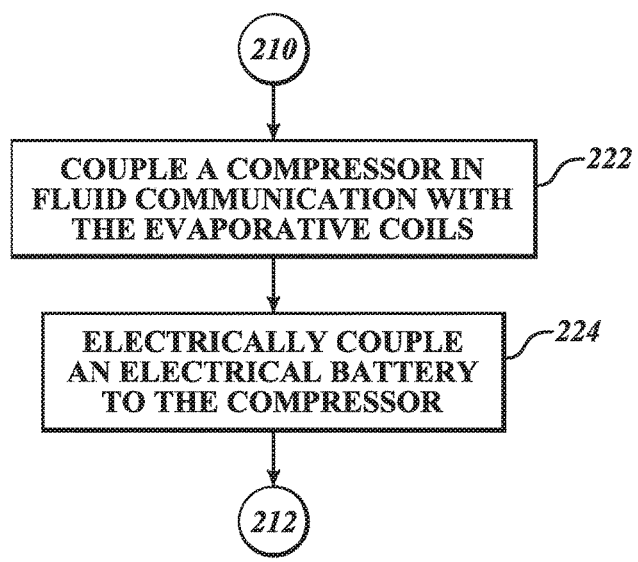

Referring to FIG. 7F, in some embodiments the method 200 may further include coupling a compressor in fluid communication with the evaporative coils at a block 222 and electrically coupling an electrical battery to the compressor at a block 224.

Figure 7G:
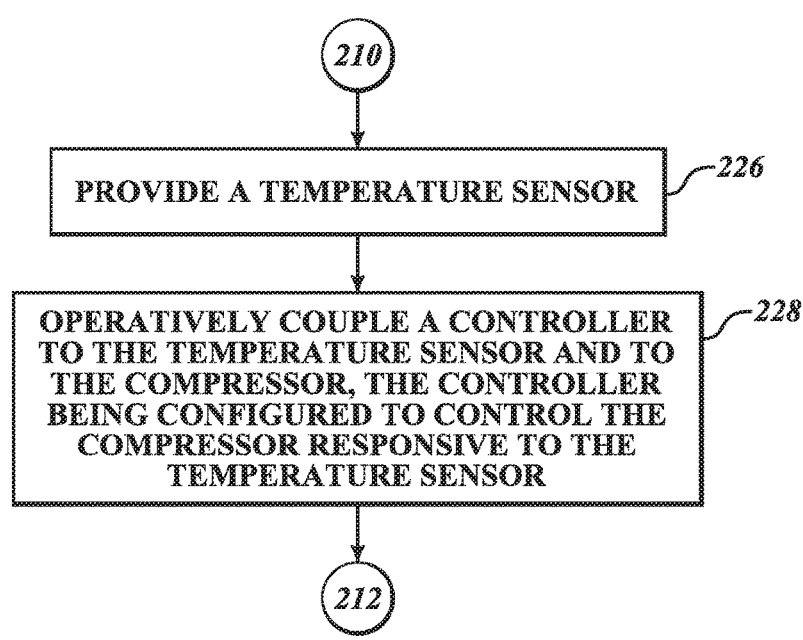

Referring to FIG. 7G, in some embodiments the method 200 may further include providing a temperature sensor at a block 226 and operatively coupling a controller to the temperature sensor and to the compressor, the controller being configured to control the compressor responsive to the temperature sensor, at a block 228.

Figure 7H:
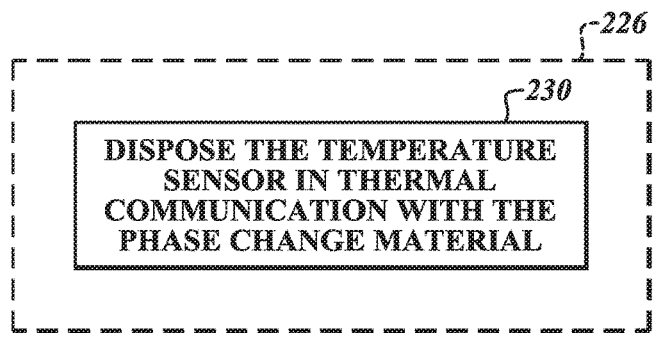

Referring to FIG. 7H, in some embodiments providing a temperature sensor at the block 226 may include disposing the temperature sensor in thermal communication with the phase change material at a block 230.

Figure 7I:
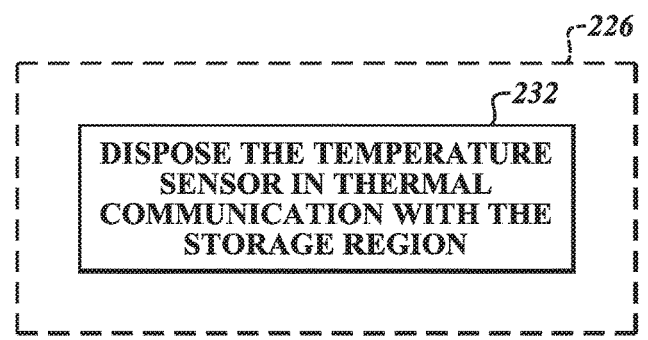

Referring to FIG. 7I, in some embodiments providing a temperature sensor at the block 226 may include disposing the temperature sensor in thermal communication with the storage region at a block 232.

Figure 7J:
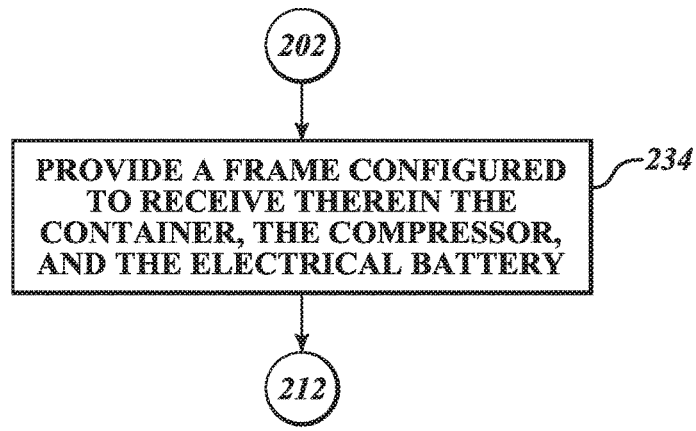

Referring to FIG. 7J, in some embodiments the method 200 may further include providing a frame configured to receive therein the container, the compressor, and the electrical battery at a block 234.

Figure 7K:
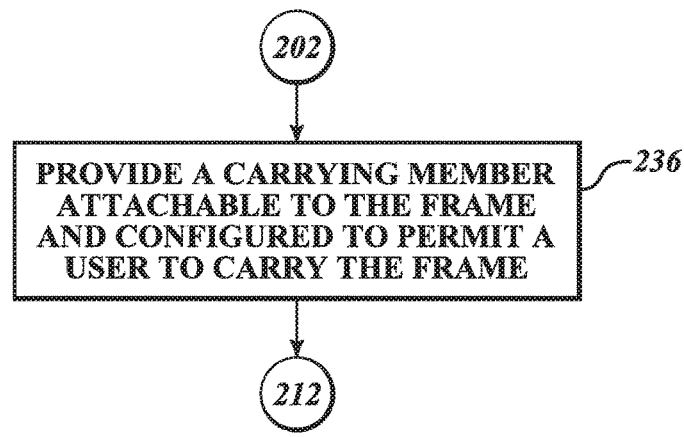

Referring to FIG. 7K, in some embodiments the method 200 may further include providing a carrying member attachable to the frame and configured to permit a user to carry the frame at a block 236.

Figure 8A:
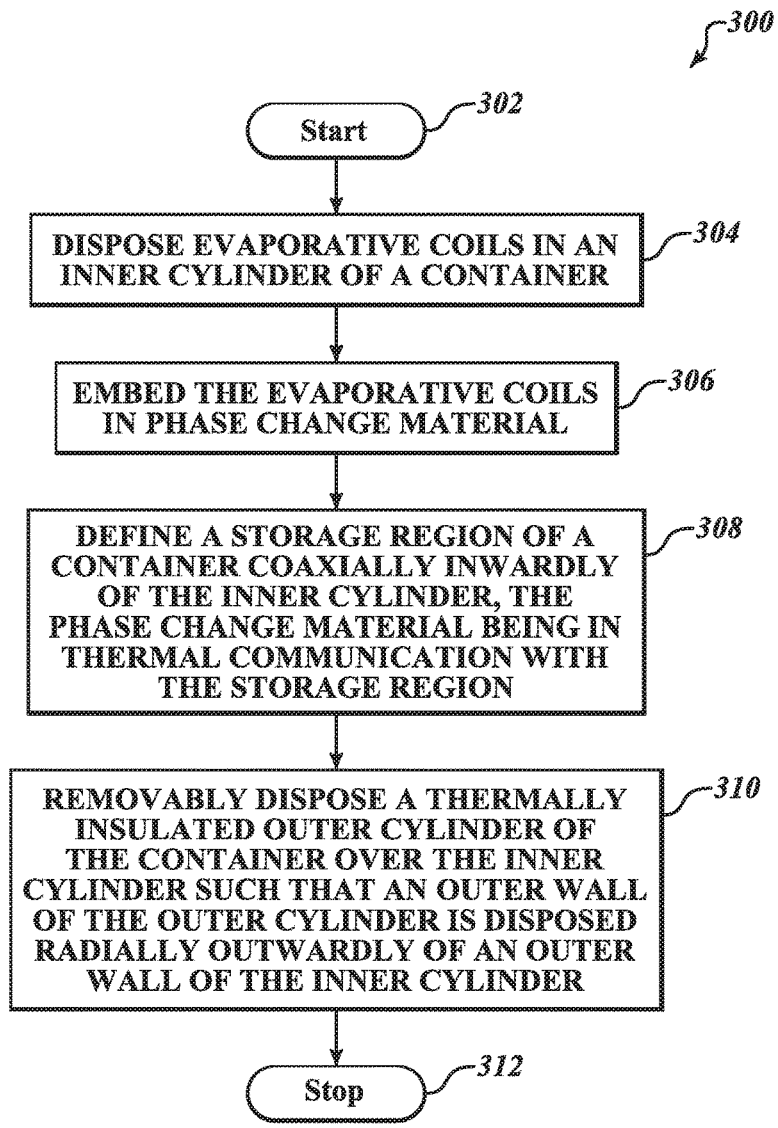
FIG. 8A is a block diagram of another illustrative method of fabricating a portable device for cold chain storage.

Referring now to FIG. 8A, another illustrative method 300 of fabricating a portable device for cold chain storage is provided. The method 300 starts at a block 302. At a block 304 evaporative coils are disposed in an inner cylinder of a container. At a block 306 the evaporative coils are embedded in phase change material. At a block 308 a storage region of a container is defined coaxially inwardly of the inner cylinder, and the phase change material is in thermal communication with the storage region. At a block 310 a thermally insulated outer cylinder of the container is removably disposed over the inner cylinder such that an outer wall of the outer cylinder is disposed radially outwardly of an outer wall of the inner cylinder. The inner cylinder and the outer cylinder form an annulus. The method 300 stops at a block 312.

Figure 8B:
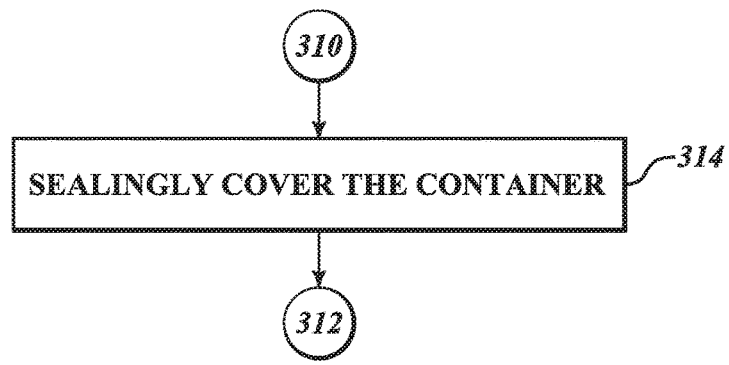
FIGS. 8B-8I are block diagrams of details of the method of FIG. 8A.

Referring to FIG. 8B, in some embodiments the method 300 may further include sealingly covering the container at a block 314.

Figure 8C:
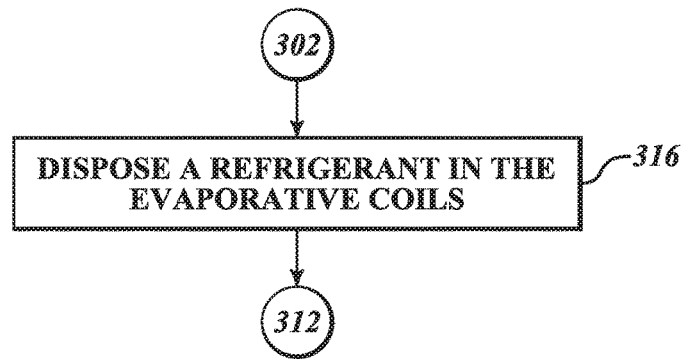

Referring to FIG. 8C, in some embodiments the method 300 may further include disposing a refrigerant in the evaporative coils at a block 316.

Figure 8D:
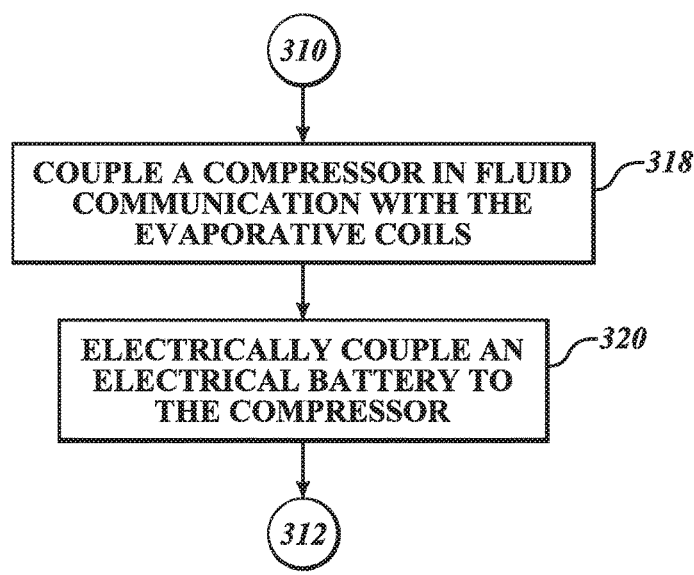

Referring to FIG. 8D, in some embodiments the method 300 may further include coupling a compressor in fluid communication with the evaporative coils at a block 318 and electrically coupling an electrical battery to the compressor at a block 320.

Figure 8E:
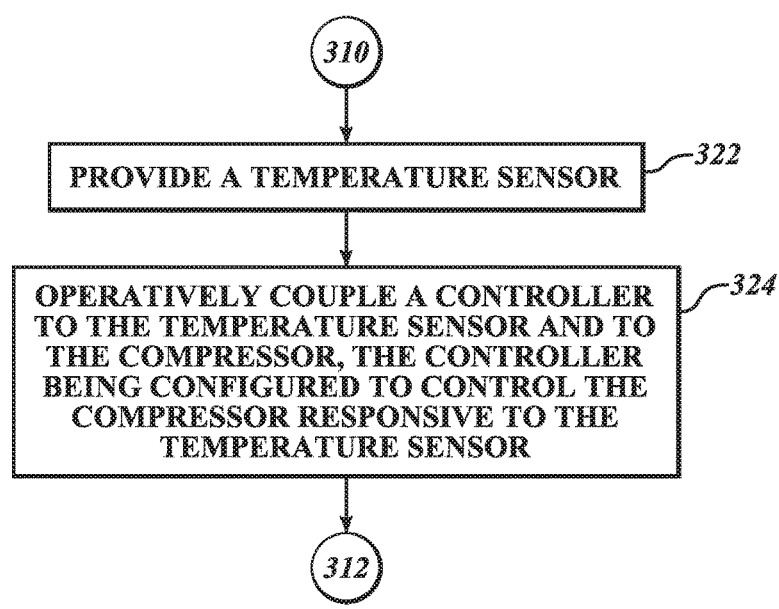

Referring to FIG. 8E, in some embodiments the method 300 may further include providing a temperature sensor at a block 322 and operatively coupling a controller to the temperature sensor and to the compressor, the controller being configured to control the compressor responsive to the temperature sensor, at a block 324.

Figure 8F:
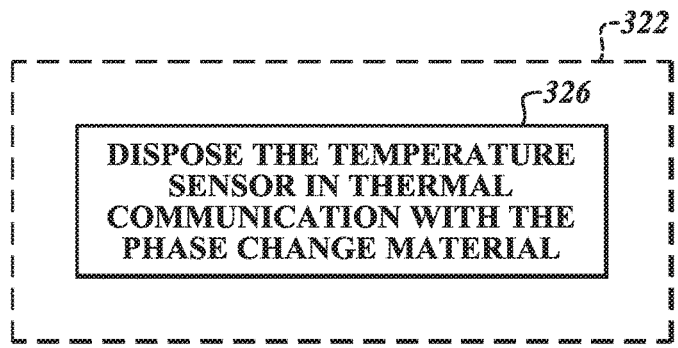

Referring to FIG. 8F, in some embodiments providing a temperature sensor at the block 322 may include disposing the temperature sensor in thermal communication with the phase change material at a block 326.

Figure 8G:
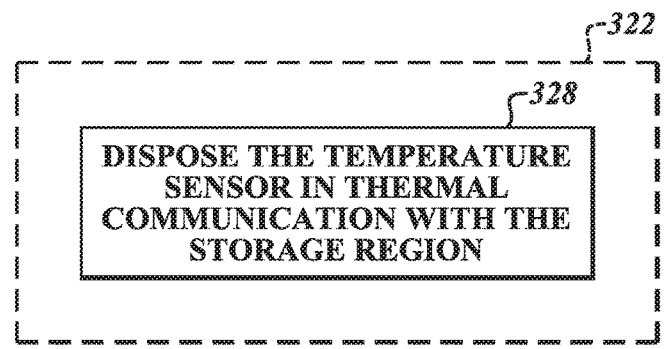

Referring to FIG. 8G, in some embodiments providing a temperature sensor at the block 322 may include disposing the temperature sensor in thermal communication with the storage region at a block 328.

Figure 8H:
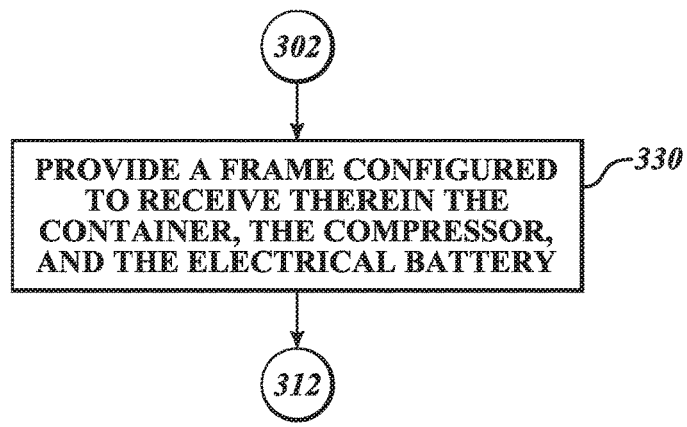

Referring to FIG. 8H, in some embodiments the method 300 may further include providing a frame configured to receive therein the container, the compressor, and the electrical battery at a block 330.

Figure 8I:
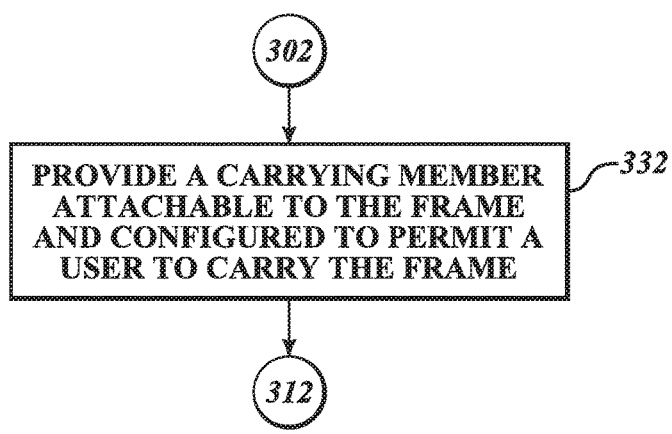

Referring to FIG. 8I, in some embodiments the method 300 may further include providing a carrying member attachable to the frame and configured to permit a user to carry the frame at a block 332.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A portable device for cold chain storage, the device comprising:
    a container defining therein a storage region, the container including:
        an inner cylinder, the storage region being defined coaxially inwardly of the inner cylinder, the inner cylinder including:
            phase change material disposed therein, the phase change material being in thermal communication with the storage region; and
            evaporative coils disposed therein, the evaporative coils being embedded in the phase change material;
        a thermally insulated outer cylinder, an outer wall of the outer cylinder being disposed radially outwardly of an outer wall of the inner cylinder;
    a compressor fluidly couplable to the evaporative coils; and
    an electrical battery electrically couplable to the compressor.

2. The device of claim 1, wherein the inner cylinder and the outer cylinder form an annulus.

3. The device of claim 1, wherein the inner cylinder is fixedly disposed within the outer cylinder.

4. The device of claim 1, wherein the outer cylinder is removably disposable over the inner cylinder.

5. The device of claim 1, wherein the outer cylinder is thermally insulated with vacuum insulation.

6. The device of claim 1, wherein the phase change material is selected to maintain temperature of the storage region in a range between 0° C. and 10° C. for a time period of about 24 hours.

7. A portable device for cold chain storage, the device comprising:
    a container defining therein a storage region, the container including:
        an inner cylinder, the storage region being defined coaxially inwardly of the inner cylinder, the inner cylinder including:
            phase change material disposed therein, the phase change material being in thermal communication with the storage region; and
            evaporative coils disposed therein, the evaporative coils being embedded in the phase change material;
        a thermally insulated outer cylinder, an outer wall of the outer cylinder being disposed radially outwardly of an outer wall of the inner cylinder, the inner cylinder being fixedly disposed within the outer cylinder, the inner cylinder and the outer cylinder forming an annulus;
    a compressor fluidly couplable to the evaporative coils; and
    an electrical battery electrically couplable to the compressor.

8. The device of claim 7, wherein the inner cylinder is defined between an inner wall of the outer cylinder and the outer wall of the outer cylinder.

9. The device of claim 7, wherein the evaporative coils include a refrigerant disposed therein.

10. The device of claim 7, wherein the outer cylinder is thermally insulated with vacuum insulation.

11. The device of claim 7, wherein the phase change material is selected to maintain temperature of the storage region in a range between 0° C. and 10° C. for a time period of about 24 hours.

12. A portable device for cold chain storage, the device comprising:
    a container defining therein a storage region, the container including:
        an inner cylinder, the storage region being defined coaxially inwardly of the inner cylinder, the inner cylinder including:
            phase change material disposed therein, the phase change material being in thermal communication with the storage region; and
            evaporative coils disposed therein, the evaporative coils being embedded in the phase change material;
        a thermally insulated outer cylinder, an outer wall of the outer cylinder being disposed radially outwardly of an outer wall of the inner cylinder, the outer cylinder being removably disposable over the inner cylinder, the inner cylinder and the outer cylinder forming an annulus;

a compressor fluidly couplable to the evaporative coils; and an electrical battery electrically couplable to the compressor.

13. The device of claim 12, wherein an inner wall of the outer cylinder is removably disposed radially outwardly of the outer wall of the inner cylinder.

14. The device of claim 12, wherein an inner wall of the inner cylinder and the outer wall of the inner cylinder are different from an inner wall of the outer cylinder and the outer wall of the outer cylinder, respectively.

15. The device of claim 12, wherein the outer cylinder is configured to sealingly cover the storage region.

16. The device of claim 12, wherein the evaporative coils include a refrigerant disposed therein.

17. The device of claim 12, wherein the outer cylinder is thermally insulated with vacuum insulation.

18. The device of claim 12, further comprising a frame configured to receive therein the container, the compressor, and the electrical battery.

19. The device of claim 12, wherein the phase change material is selected to maintain temperature of the storage region in a range between 0° C. and 10° C. for a time period of about 24 hours.

20. A method of fabricating a portable device for cold chain storage, the method comprising:

disposing evaporative coils in an inner cylinder of a container;

embedding the evaporative coils in phase change material;

defining a storage region of a container coaxially inwardly of the inner cylinder, the phase change material being in thermal communication with the storage region;

removably disposing a thermally insulated outer cylinder of the container over the inner cylinder such that an outer wall of the outer cylinder is disposed radially outwardly of an outer wall of the inner cylinder, the inner cylinder and the outer cylinder forming an annulus;

coupling a compressor in fluid communication with the evaporative coils; and electrically coupling an electrical battery to the compressor.

21. A portable device for cold chain storage, the device comprising:

a container defining therein a storage region, the container including:

an inner cylinder, the storage region being defined coaxially inwardly of the inner cylinder, the inner cylinder including:

phase change material disposed therein, the phase change material being in thermal communication with the storage region; and evaporative coils disposed therein, the evaporative coils being embedded in the phase change material;

a thermally insulated outer cylinder, an outer wall of the outer cylinder being disposed radially outwardly of an outer wall of the inner cylinder;

a compressor fluidly couplable to the evaporative coils;

an electrical battery electrically couplable to the compressor; and a lid configured to sealingly cover the container.

22. The device of claim 21, wherein the inner cylinder and the outer cylinder form an annulus.

23. The device of claim 21, wherein the inner cylinder is fixedly disposed within the outer cylinder.

24. The device of claim 21, wherein the outer cylinder is removably disposable over the inner cylinder.

25. The device of claim 21, wherein the evaporative coils include a refrigerant disposed therein.

26. The device of claim 21, wherein the outer cylinder is thermally insulated with vacuum insulation.

27. The device of claim 21, wherein the compressor includes a miniaturized compressor.

28. The device of claim 21, further comprising:

a temperature sensor; and a controller operatively couplable to the temperature sensor and operatively coupled to the compressor, the controller being configured to control the compressor responsive to the temperature sensor.

29. The device of claim 21, further comprising a frame configured to receive therein the container, the compressor, and the electrical battery.

30. The device of claim 21, wherein the phase change material is selected to maintain temperature of the storage region in a range between 0° C. and 10° C. for a time period of about 24 hours.

* * * * *